US009950788B2

(12) United States Patent
Garcia et al.

(10) Patent No.: US 9,950,788 B2
(45) Date of Patent: Apr. 24, 2018

(54) MAGRAIL, BLEED AIR DRIVEN LIFT FAN (71) Applicant: Northrop Grumman Systems Corporation, Falls Church, VA (US)

(72) Inventors: Ruben Garcia, Lancaster, CA (US); Neil Echon, Lancaster, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 273 days.

(21) Appl. No.: 14/798,637

(22) Filed: Jul. 14, 2015

(65) Prior Publication Data

US 2017/0015413 A1 Jan. 19, 2017

(51) Int. Cl.
B64C 29/00 (2006.01)
B64C 11/00 (2006.01)

(52) U.S. Cl.
CPC ........ B64C 29/0016 (2013.01); B64C 11/001 (2013.01); B64C 11/008 (2013.01); B64C 29/0025 (2013.01)

(58) Field of Classification Search
CPC ..... B64C 11/001; B64C 11/008; B64C 27/20; B64C 27/22; B64C 2027/8254
See application file for complete search history.

(56) References Cited

U.S. PATENT DOCUMENTS

| 3,388,878 | A | * | 6/1968 | Peterson | B64C 29/0033 244/12.3 |
| 3,437,290 | A | * | 4/1969 | Norman | B64C 27/20 244/12.2 |
| 3,437,920 | A | * | 4/1969 | Anderson | G01R 17/00 307/111 |
| 6,404,089 | B1 | | 6/2002 | Tomion | |
| 7,032,859 | B2 | | 4/2006 | Mohr | |
| 7,032,861 | B2 | | 4/2006 | Sanders, Jr. et al. | |
| 7,335,071 | B1 | * | 2/2008 | Motsenbocker | B63H 23/30 440/1 |
| 7,857,254 | B2 | | 12/2010 | Parks | |
| 8,459,954 | B2 | * | 6/2013 | Anderson | F01D 5/3015 29/889.21 |
| 8,636,241 | B2 | | 1/2014 | Lugg et al. | |
| 8,752,787 | B2 | | 6/2014 | Ruan et al. | |

(Continued)

FOREIGN PATENT DOCUMENTS

| WO | 2006113877 | 10/2006 | |
| WO | WO 2013075954 A1 * | 5/2013 | ............ F01D 11/122 |
| WO | 2014021798 | 2/2014 | |

OTHER PUBLICATIONS

Lieblein, S.; A review of lift fan propulsion systems for civil VTOL transports; 6th Propulsion Joint Specialists Conf; Jun. 15-18, 1970; San Diego, CA; NASA TM X-52829; NASA Technical Memorandum.

(Continued)

Primary Examiner — Logan Kraft
Assistant Examiner — Sabbir Hasan
(74) Attorney, Agent, or Firm — Patti & Malvone Law Group, LLC (57) ABSTRACT A lift fan for use in short takeoff and vertical landing (STOVL) aircraft is disclosed and claimed. The lift fan is driven by bleed air from a main engine of the aircraft and may be controlled by an electromagnet. This eliminates the drag and torque on the main engine and reduces fuel cost and engine wear.

7 Claims, 6 Drawing Sheets (56) References Cited

U.S. PATENT DOCUMENTS

| | | |
|---|---|---|
| 2009/0121073 A1 | 5/2009 | Doane et al. |
| 2013/0134263 A1 | 5/2013 | Roy |
| 2013/0251525 A1 | 9/2013 | Saiz |

OTHER PUBLICATIONS

Kwek, H.L.; Viability of Cross-Flow Fan with Helical Blades for Vertical Take-off and Landing Aircraft; Thesis; Monterey, California; Naval Postgraduate School; Sep. 2012; 71 pp.; http://hdl.hanlde.net/10945/17391.

Dugan; J.F. et al; Preliminary study of an air generator-remote lift fan propulsion system for VTOL transports; Technical Report of the NASA Lewis Research center; Aug. 1, 1971; NASA Technical Memorandum; NASA TM X-67916.

Ganev, E. et al; Power and Thermal Management for Future Aircraft; SAE Technical Paper 2013-1-2273; Sep. 2013; SAE International; doi:10.4271/2013-1-2273.

\* cited by examiner

MAGRAIL, BLEED AIR DRIVEN LIFT FAN

FIELD OF THE INVENTION

The invention relates generally to short takeoff and vertical landing (STOVL) aircraft and more particularly to an improved lift fan.

BACKGROUND

A STOVL aircraft is a fixed wing aircraft that is able to take off from a short runway or even vertically in some circumstances, and land vertically. To achieve vertical lift, the aircraft uses a lift fan that to provide vertical thrust. The use of a short runway allows the aircraft to carry a larger payload than a purely VTOL (vertical takeoff and landing) aircraft, although the two types are closely related, particularly when it comes to achieving vertical lift. For the purposes of this application, STOVL should be interpreted as also including VTOL.

Since STOVL aircraft are fixed wing, they have the need to provide vertical lift during takeoff and landing, but forward propulsion during flight. Prior art aircraft provide vertical lift in a variety of ways. One known method is to redirect some portion of the airflow generated by the main turbine used during forward flight in a downward direction using vectoring nozzles. This method is used, for example, by Hawker Siddeley Harrier aircraft.

Another prior art aircraft is the F-35 Lightning which uses a separate lift fan that is connected to the main engine by a drive shaft. This type of system is shown, for example, in U.S. Pat. No. 8,910,464. However, this type of system creates a large load on the main engine, leading to breakage and other problems associated with extra torque on the engine.

Thus, a need exists for a lift fan in a STOVL aircraft that eliminates the drag and torque on the main engine and reduces fuel cost and engine wear.

SUMMARY

A lift fan for use in short takeoff and vertical landing (STOVL) aircraft is disclosed and claimed. The lift fan is driven by bleed air from a main engine of the aircraft and may be controlled by an electromagnet. The invention in one implementation encompasses an apparatus a lift fan for providing vertical lift to an aircraft, including a housing, which features a center mount, an outer rim, an inner circumference of the outer rim having a slot, an electromagnet mounted in the slot of the outer rim, an inlet for receiving compressed or bleed air from an engine of the aircraft and directing it into the slot and an outlet for expelling air from the housing; and a fan removeably attached to the center mount of the housing, the fan having a plurality of blades, each blade having a blade tip extending into the slot in the outer rim of the housing wherein the compressed or bleed air from the engine causes the fan to rotate.

In a further embodiment, each fan blade further includes one or more magnets for engaging with the electromagnet.

In yet another embodiment, the electromagnet is controlled to center the fan in the slot or to stop the fan.

In a further embodiment, the invention encompasses a lift fan for providing vertical lift to an aircraft a housing with a center mount, an outer rim, an inner circumference of the outer rim further comprising a slot, an inlet for receiving compressed or bleed air from an engine of the aircraft and directing it into the slot, an outlet for expelling air from the housing and a coating of polytetrafluoroethylene (PTFE) on the slot; and a fan removeably attached to the center mount of the housing, the fan further comprising a plurality of blades, each blade comprising a blade tip extending into the slot in the outer rim of the housing wherein the compressed or bleed air from the engine causes the fan to rotate.

In either of the above embodiments, each blade of the lift fan includes a curved support mounted perpendicularly to the blade and following the curvature of the outer rim of the housing, the curved support located inside the slot in the outer rim.

In either of the above embodiments, the fan includes a center hub having a plurality of slots and a plate, each of the plurality of blades inserted into a slot and held in place by the plate, a bolt extending through the center mount, the center hub and the plate and a nut engaged with the bolt to secure the fan to the housing.

In either of the above embodiments, the housing has an insulating material between the housing and the fan.

DESCRIPTION OF THE DRAWINGS

Features of example implementations of the invention will become apparent from the description, the claims, and the accompanying drawings in which:

DETAILED DESCRIPTION

Figure 1A:
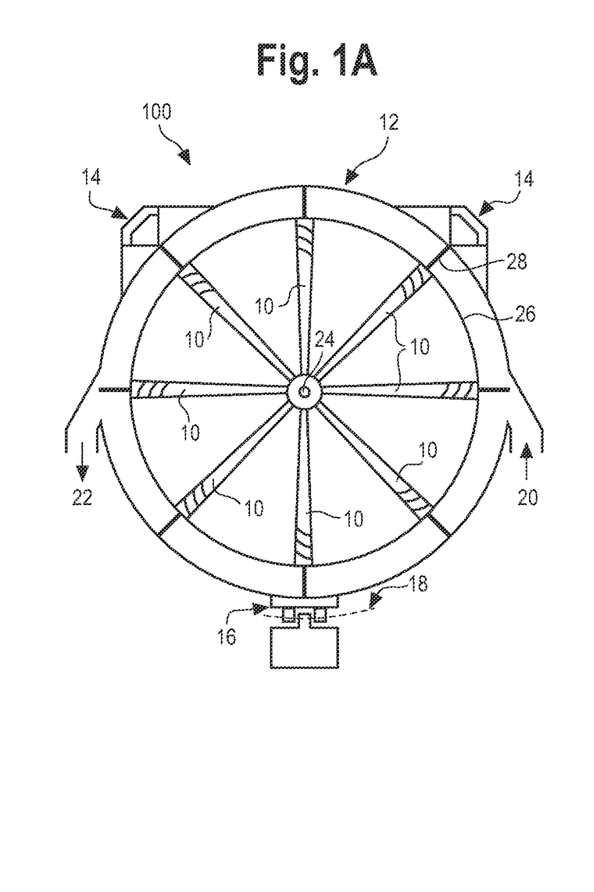
FIG. 1A depicts a top view of a lift fan and housing according to the present invention.

Turning to FIG. 1A, a lift fan 100 in one example comprises a plurality of fan blades 10 mounted in a housing 12. In a preferred embodiment, housing 12 is made from magnesium or aircraft strength aluminum, although any suitable material could be used. Housing 12 includes front mounts 14 which allow lift fan 100 to be mounted in an aircraft by means of clamps, not shown. Rear mount 16 allows lift fan 100 to be attached to the aircraft using a pin (not shown) inserted along line 18. Although specific front and rear mounts have been shown, one of ordinary skill in the art would readily understand that alternative mounting arrangements could be used.

Housing 12 includes an inlet 20 for receiving high velocity air from an engine of the aircraft. In an embodiment, this air can be compressed air or bleed air. After air passes through the housing it is expelled through outlet 22. Air exiting outlet 22 can be directed either back to inlet 20 or expelled to ambient air.

Fan blades 10 are mounted to a center hub 24, shown in more detail below. Each fan blade 10 includes an curved support 26 (shown in FIG. 1B) close to but not at the outer end of fan blade 10. An extension 28 of each fan blade 10 extends beyond curved support 26 as shown in more detail below.

Figure 1B:
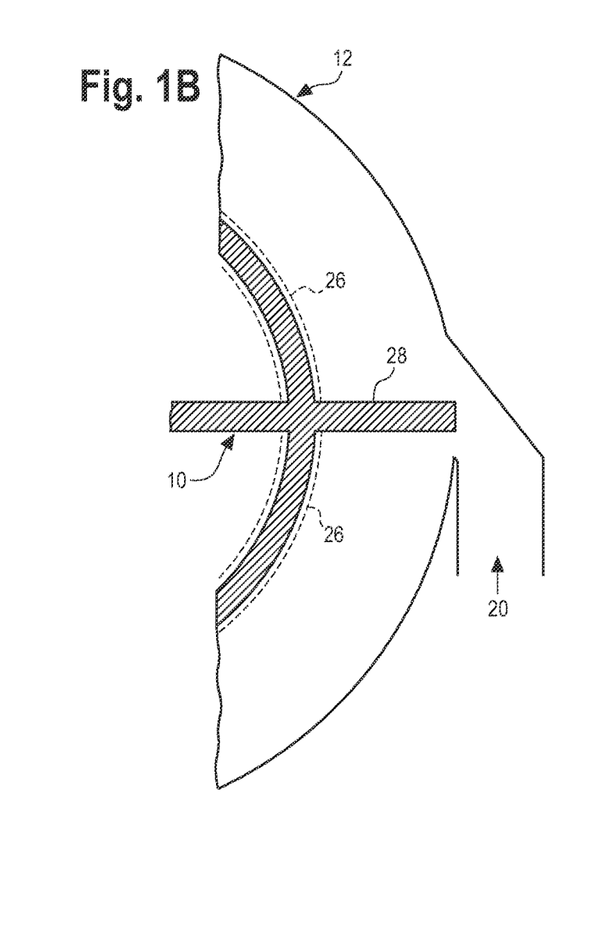
FIG. 1B depicts an enlarged view of a portion of the lift fan of FIG. 1A.

FIG. 1B shows an enlarged view of a portion of lift fan 100 of FIG. 1A. Fan blade 10 includes curved support sections 26 which interconnect to form an annular ring within housing 12. Extension 28 of fan blade 10 is located in housing 12 such that air from inlet 20 pushes against extension 28 so as to cause lift fan 100 to rotate.

Figure 2A:
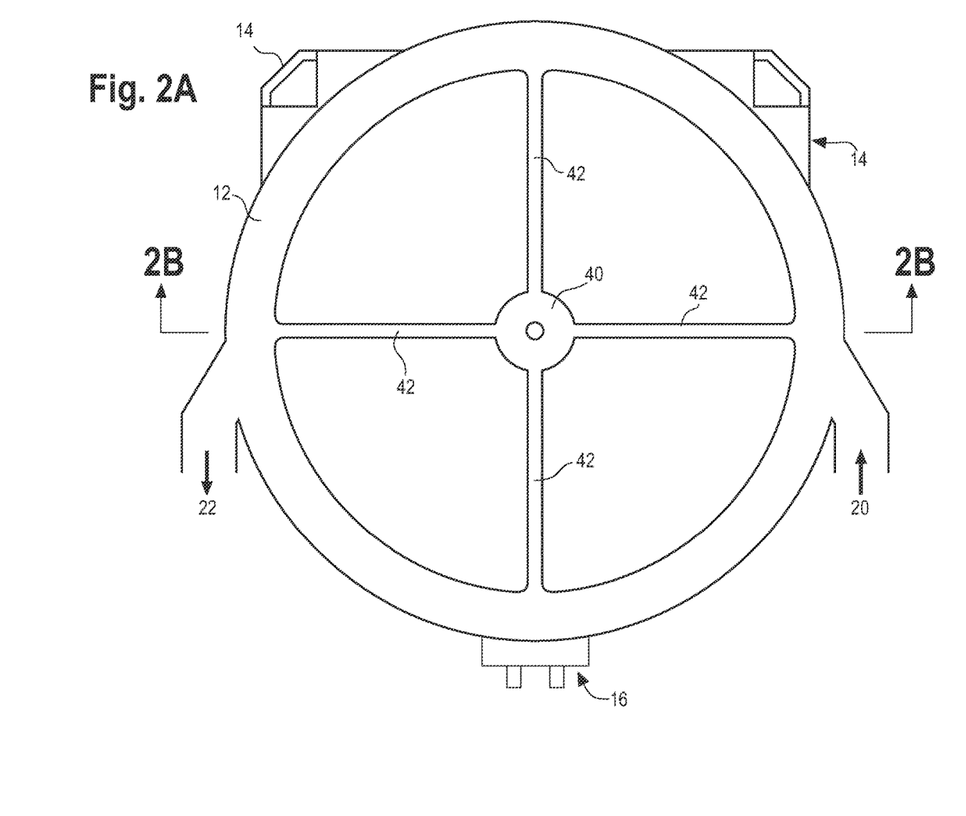
FIG. 2A depicts a top view of housing 12 from FIG. 1A.
Figure 2B:
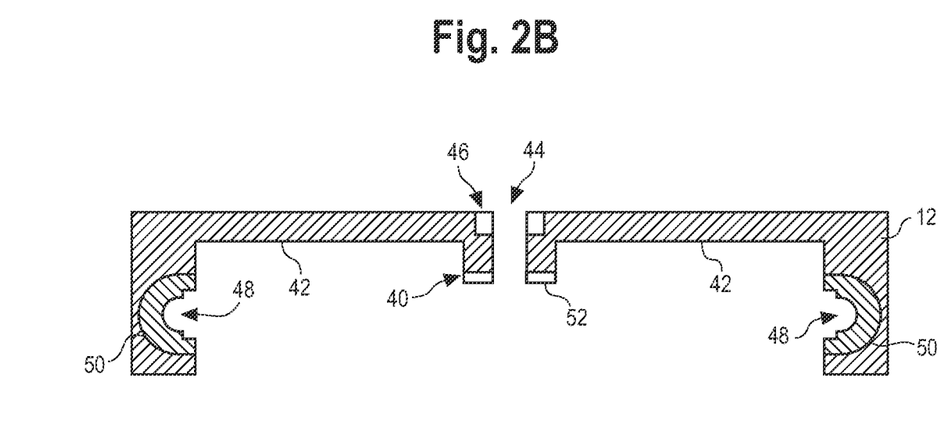
FIG. 2B depicts a cross-section view of housing 12 from FIG. 2A.

FIG. 2A shows a top view of housing 12. Similarly to FIG. 1A, housing 12 includes inlet 20 and outlet 22, as well as front mounts 14 and rear mount 16. In addition, FIG. 2A shows center cap paddock 40 which is attached to the outer portion of housing 14 by arms 42. A cross section view of housing 12 along line A-A in FIG. 2A is shown in FIG. 2B. Center cap paddock 40 includes a bolt hole 44 and pressed precision bearing 46. Center hub 24 (FIG. 3C) is bolted to the inner side of center cap paddock 40 next to spacer 52. In an embodiment, spacer 52 is made of polytetrafluoroethylene but any similar material could be used. Housing 12 features a channel 48 around it's inner circumference into which blade tips 28 of FIG. 1B extend. Electromagnet 50 is mounted in housing 12 to provide centering and braking of fan blade 10.

Figure 3A:
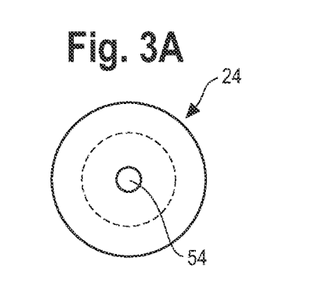
FIG. 3A depicts a top view of a center cap in accordance with the present invention.
Figure 3B:
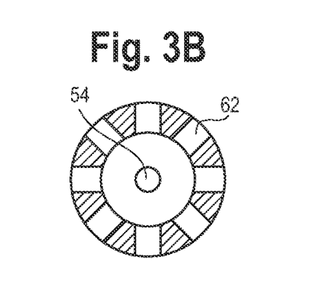
FIG. 3B depicts a bottom view of the center cap of FIG. 3A.
Figure 3C:
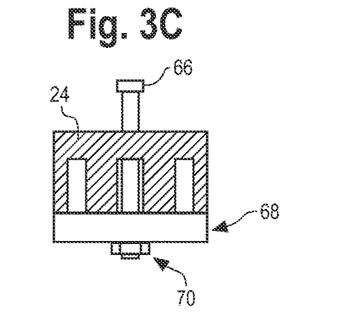
FIG. 3C depicts a cross sectional side view of the center cap of FIG. 3A.
Figure 3D:
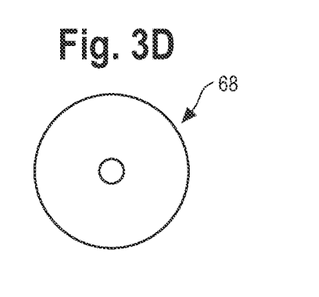
FIG. 3D depicts a center cap plate for use with the center cap of FIG. 3C.

FIG. 3A shows a top view of a center hub 24 of FIG. 1A. Mounting hole 54 will align with bolt hole 44 of FIG. 2B. FIG. 3B shows a bottom view of center hub 24. A plurality of slots 62 receive fan blades 10 of FIGS. 1A-1B. FIG. 3C shows a cross sectional side view of center hub 24. In an embodiment, bolt 66 extends through center cap paddock 40 (FIG. 2B), center hub 24 and plate 68 and is secured with nut 70. Alternative methods of securing center hub 24 and plate 68 to center cap paddock 40 could be used as understood by one of ordinary skill in the art. FIG. 3D shows a bottom view of plate 68 of FIG. 3C.

Figure 4:
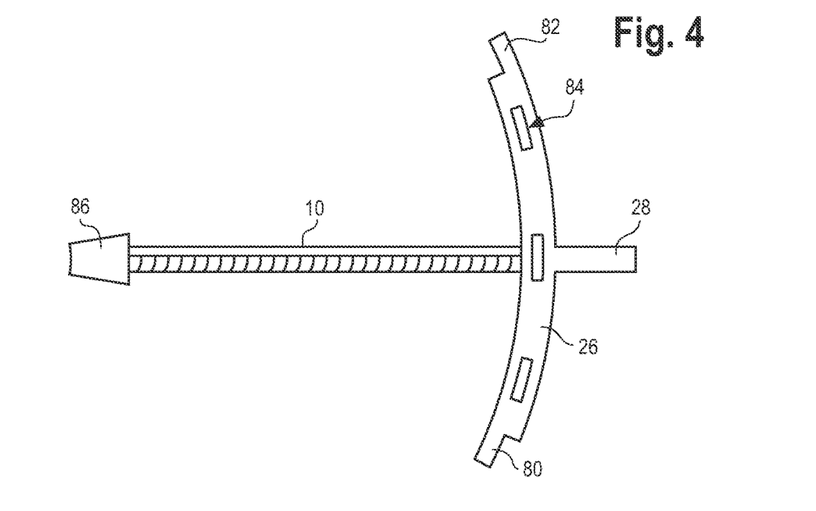
FIG. 4 depicts a cross sectional top view of the fan blade of FIG. 1B.

FIG. 4 shows a cross sectional top view of fan blade 10 of FIGS. 1A-1B. Fan blade 10 is connected to curved support 26 and blade tip 28. Each end of curved support 26 ends in opposing tabs that interlock. Each tab 80 cooperates with tab 82 of an adjoining fan blade 10 to form a complete ring when all the fan blades are installed. Fan blade 10 is terminates in inner end 86, which is inserted into slots 62 of center hub 24 as shown in FIG. 3B. Magnetic material 84 cooperates with an electromagnet 52 of housing 12 (shown in FIGS. 2B and 5A). Although shown as a series of separate magnets, magnetic material 84 could also be made of a solid ring of magnetic material.

Figure 5A:
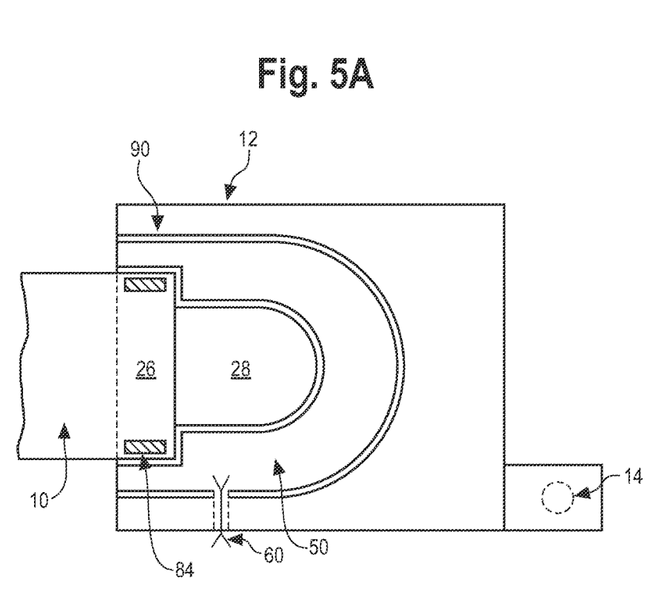
FIG. 5A depicts a cross sectional side view of the housing and fan blade of FIG. 1A.

FIG. 5A shows a cross sectional side view of the housing of FIG. 1A. Housing 12 encloses an electromagnet 50, which is separated from housing 12 by an spacing 90. In an alternative embodiment, spacing 90 is an non-magnetic material such as rubber or polytetrafluoroethylene (PTFE). It is necessary to separate and also insulate fan blade 10 from the environment and its corrosive properties. Blade tip 28 and curved support 26 ride inside electromagnet 50. In operation electromagnet 50 is controlled through wiring 60 and cooperates with magnetic material 84 to provide braking of the lift fan. It also provides centering and stabilization of the fan in the housing 12. The use of an electromagnet allows the polarity of the magnet to be changed. Giving electromagnet 50 an opposite polarity as magnetic material 84 results in a braking operation. The same polarity provides stability.

Figure 5B:
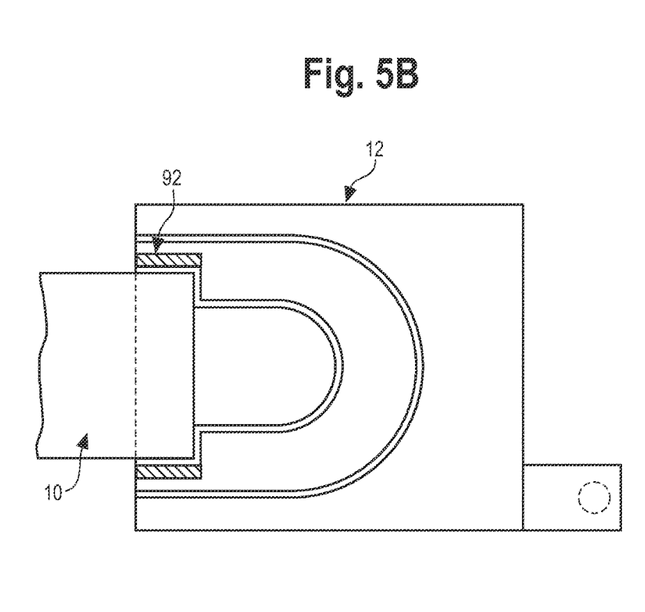
FIG. 5B depicts an alternative embodiment of the housing of FIG. 5A.

An alternative embodiment is shown in FIG. 5B. In this embodiment, the housing does not include an electromagnet. Instead housing 12 includes material 92, for example, PTFE. This ensures that fan blade 10 rides smoothly in housing 12.

Figure 6A:
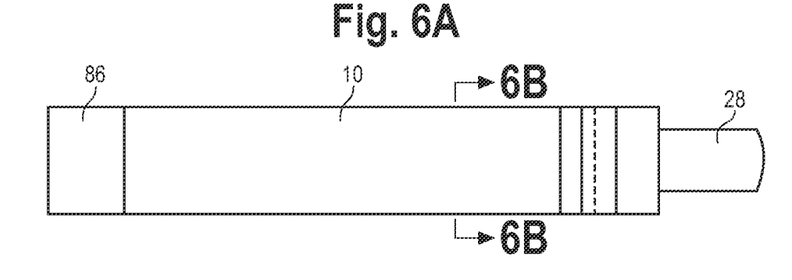
FIG. 6A depicts a side view of the fan blade.
Figure 6B:
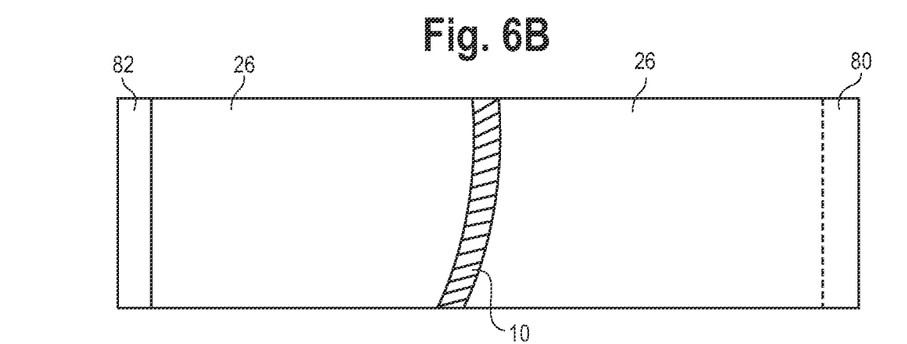
FIG. 6B depicts a cross sectional view of the fan blade of FIG. 6A.

FIG. 6A shows a side of fan blade 10 and blade tip 28. FIG. 6B shows a sectional view of blade 10 along line B-B of FIG. 6A. Arced support 26 ends in tabs 80 and 82 as shown in FIG. 4. Blade 10 includes a curvature typical of fan blades. The exact curve of the fan blade would vary along its length as would be understood by one of ordinary skill in the art.

If used and unless otherwise stated, the terms "upper," "lower," "front," "back," "over," "under," and similar such terms are not to be construed as limiting the invention to a particular orientation. Instead, these terms are used only on a relative basis.

An illustrative description of operation of the apparatus 100 is presented, for explanatory purposes.

The steps or operations described herein are just for example. There may be many variations to these steps or operations without departing from the spirit of the invention. For instance, the steps may be performed in a differing order, or steps may be added, deleted, or modified.

Although example implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. A lift fan for providing vertical lift to an aircraft, comprising:
 a housing, said housing further comprising:
  a center mount;
  an outer rim, an inner circumference of said outer rim further comprising a slot;
  an electromagnet mounted in the slot of the outer rim;
  an inlet for receiving compressed or bleed air from an engine of the aircraft and directing it into the slot; and
  an outlet for expelling air from the housing; and
 a fan removeably attached to the center mount of the housing, said fan further comprising:
  a plurality of blades, each blade comprising a blade tip extending into said slot in the outer rim of the housing;
  a center hub having a plurality of slots and a plate, each of the plurality of blades inserted into a slot and held in place by the plate;
  a bolt extending through said center mount, said center hub and said plate; and
  a nut engaged with said bolt to secure the fan to the housing;
 the fan being configured to rotate due to the air directed into the slot pushing on the blade tips.

2. The lift fan of claim 1, wherein each blade further comprises a curved support mounted perpendicularly to the blade and following the curvature of the outer rim of the housing, said curved support located inside said slot in said outer rim.

3. The lift fan of claim 2, wherein said one or more magnets are located in each said curved support.

4. The lift fan of claim 3 wherein the polarity of the electromagnet is selected to center the fan in the slot.

5. The lift fan of claim 3 wherein the polarity of the electromagnet is selected to brake the fan.

6. The lift fan of claim 1, further comprising an insulating material between said housing and said electromagnet.

7. A lift fan for providing vertical lift to an aircraft, comprising:
 a housing, said housing further comprising:
  a center mount;
  an outer rim, an inner circumference of said outer rim further comprising a slot;
  an inlet for receiving compressed or bleed air from an engine of the aircraft and directing it into the slot;
  an outlet for expelling air from the housing; and
  a coating of polytetrafluoroethylene (PTFE) on said slot; and
 a fan removeably attached to the center mount of the housing, said fan further comprising:
  a plurality of blades, each blade comprising a blade tip extending into said slot in the outer rim of the housing;
  a center hub having a plurality of slots and a plate, each of the plurality of blades inserted into a slot and held in place by the plate;
  a bolt extending through said center mount, said center hub and said plate; and
  a nut engaged with said bolt to secure the fan to the housing;
 the fan being configured to rotate due to the air directed into the slot pushing on the blade tips.

\* \* \* \* \*